United States Patent

Arnold et al.

[11] Patent Number: 6,099,584
[45] Date of Patent: Aug. 8, 2000

[54] SYSTEM TO FIX POST-LAYOUT TIMING AND DESIGN RULES VIOLATIONS

[75] Inventors: Ginetti Arnold, Antibes; Francois Silve, le Cannet, both of France; Satish Raj, Campbell, Calif.

[73] Assignee: VSLI Technology, Inc., San Jose, Calif.

[21] Appl. No.: 08/759,711

[22] Filed: Dec. 6, 1996

[51] Int. Cl.⁷ .................................................. G06F 17/50
[52] U.S. Cl. .................................. 716/19; 716/2; 716/4; 716/18
[58] Field of Search .......................... 364/490; 395/704; 716/19, 18, 4, 2

[56] References Cited

U.S. PATENT DOCUMENTS

| | | | |
|---|---|---|---|
| 5,425,591 | 6/1995 | Ginetti et al. | 716/18 |
| 5,572,436 | 11/1996 | Dangelo et al. | 401/191 |
| 5,910,897 | 6/1999 | Dangelo | 718/19 |

OTHER PUBLICATIONS

Timing modeling of datapath layout for synthesis. Ginetti, A. Verilog HDL conference, 1994.

*Primary Examiner*—Paul R. Lintz
*Assistant Examiner*—Thuan Do
*Attorney, Agent, or Firm*—Wagner Murabito & Hao LLP

[57] ABSTRACT

A programmed design tool and method for determining the placement of components of a very large scale integrated circuit. The present invention is characterized by a common timing engine adapted to check front end high level timing constraints in relation to a netlist representing the circuit.

4 Claims, 6 Drawing Sheets

SYSTEM TO FIX POST-LAYOUT TIMING AND DESIGN RULES VIOLATIONS

This invention relates to the design of very large scale integrated circuits by means of a programmed computer and particularly the performance of spatial organization of the components of a circuit. This spatial organization or layout will normally be performed after the functional specification of a circuit has been converted into a netlist, representing a description of the gates, delay elements and other circuit elements and how, functionally, they are interconnected. The spatial organization is necessary to augment the netlist by a description of the actual placement of the components.

Two aspects of spatial organization are termed herein 'timing-driven layout' and 'in-place optimization'. They are defined, at high level, by algorithms which may in general be implemented in a selected machine language.

Timing driven layout (TOL) algorithms are necessary to place designs according to some chip level timing constraints—that is they are adapted to reduce the wiring capacitance on a node subject to a very tight timing constraint. Timing driven layout algorithms accept as inputs a netlist and some timing constraint information and code a timing driven placed netlist or layout.

At the present time most TLD algorithm do not work directly with the chip level timing constraints; instead they receive as input some 'digested' timing constraints. Digested timing constraints are low level timing constraints generated from chip level user-specified timing constraints by a 'netlist forward annotator'. Digested timing constraints are usually divided into two main categories, the net timing slack constraint and the path-based constraint.

The not timing slack is used to indicate how much slack or tolerance is available on a net. Path-based constraints are used to indicate how much delay is available for individual paths through a design. More specifically, a path-based constraint is composed of a path that is a chain of interconnected netlist instances and a required time value for that path, that is a timing value specifying the maximum signal propagation timing through that chain.

In both cases, the delay values are based on the chip level user-specified timing constraints such as the clock frequency or the arrival times of signals at on external input connectors. The invention is particularly concerned with the difficulties arising from path-based constraints which are usually written in SDF syntax. SDF files are generated by so-called forward annotators (report coverdesign utilities) from high level timing constraints. Currently a TDL program tool checks the ting along the paths specified in the SDF files, using its own embedded timing verifier. Note that by definition, a TDL tool merely checks the paths reported in the coverDesign and not all the timing paths. This is illustrated in FIG. 1. In FIG. 1.a is a deliberately oversimplified design. FIG. 1.b shows all the timing paths constrained to 1ns. In FIG. 1.c are shown the timing paths that would be reported by a coverdesign utility. The coverdesign utility is just guaranteeing that all the nodes are covered by the worst paths going through them. It does not guarantee that all the paths are covered; this would be anyway unrealistic in real design. Finally, these reported paths are found according to the estimated wirecap model used before the placement. Let it be imagined that after the placement, the the wirecaps are totally different from what they were supposed to be before the placement, and thus that the worst paths of the design are no longer something like u1-u2-u3-u4-u5-u6 but rather something like u1-u2-u3-u4-u8, then the limitation of this methodology is that TDL will never check this path because it did not got into the SDF file through the use of coverDesign.

Synthesis tools run many timing verifications in order to achieve a design that meets the user-specified timing constraints. These timing verifications are done using predictive interconnect capacitance. Placement takes place after the synthesis. It consists of allocating a real physical placement to the synthesized design leaf component. Once the placement is done, interconnect capacitance can be accurately estimated and quite often these estimated interconnect capacitances are different from the ones obtained out of the predictive model used by the synthesis tool. As a matter of fact, timing violations may be created by the placement.

In Place Optimization (IPO) is a process which takes place after the design placement and which attempts to fix these post-placement timing violations. It mainly consists in swapping gates by equivalent gates, having exactly the same behaviour, but having for eagle better drive capabilities more appropriate to drive heavily loaded nodes.

An example of the invention will be described with reference to the drawings.

DETAILED DESCRIPTION

A TDL tool suffers from the following limitations.

(i) Because SDF files are huge, typically 20 Mbytes for 36K instance designs, it thus takes quite a t to generate these files by the forward annotator and substantial memory is also necessary to the TDL to store thee paths and to check them.

(ii) SDP files only contain very low subsets of all the timing paths of a design, i.e. TLD tools do not check all the paths.

(iii) A TD tool runs its own timing verifier, which is thus different from the timing verifier used by the front-end tools such as the synthesis tools, the forward annotator and so on. It creates some timing inconsistencies and requires a lot of maintenance.

Figure 1:
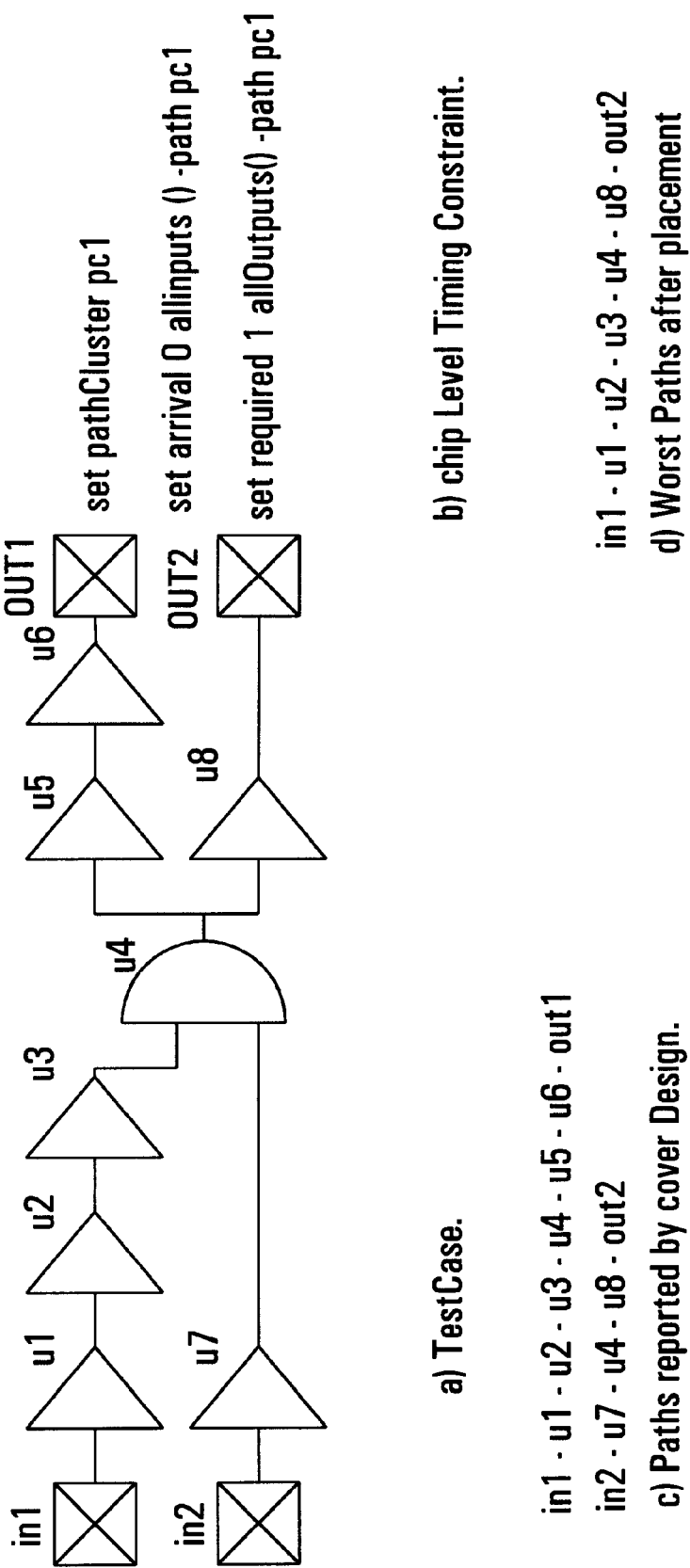
FIG. 1, previously mentioned, illustrates a simple netlist and its timing paths.
Figure 2:
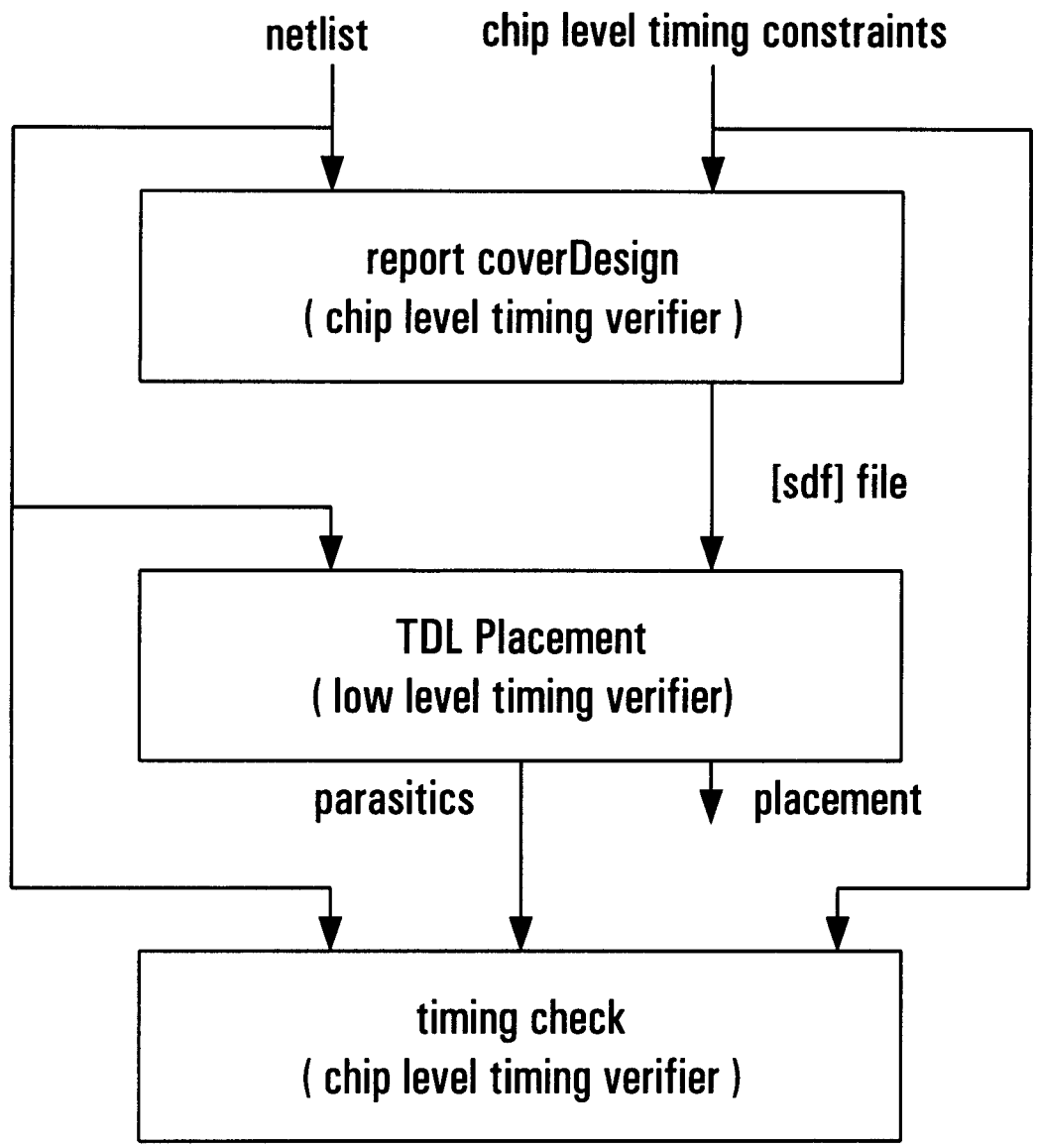
FIG. 2 illustrates a known timing-driven layout algorithm.
Figure 3:
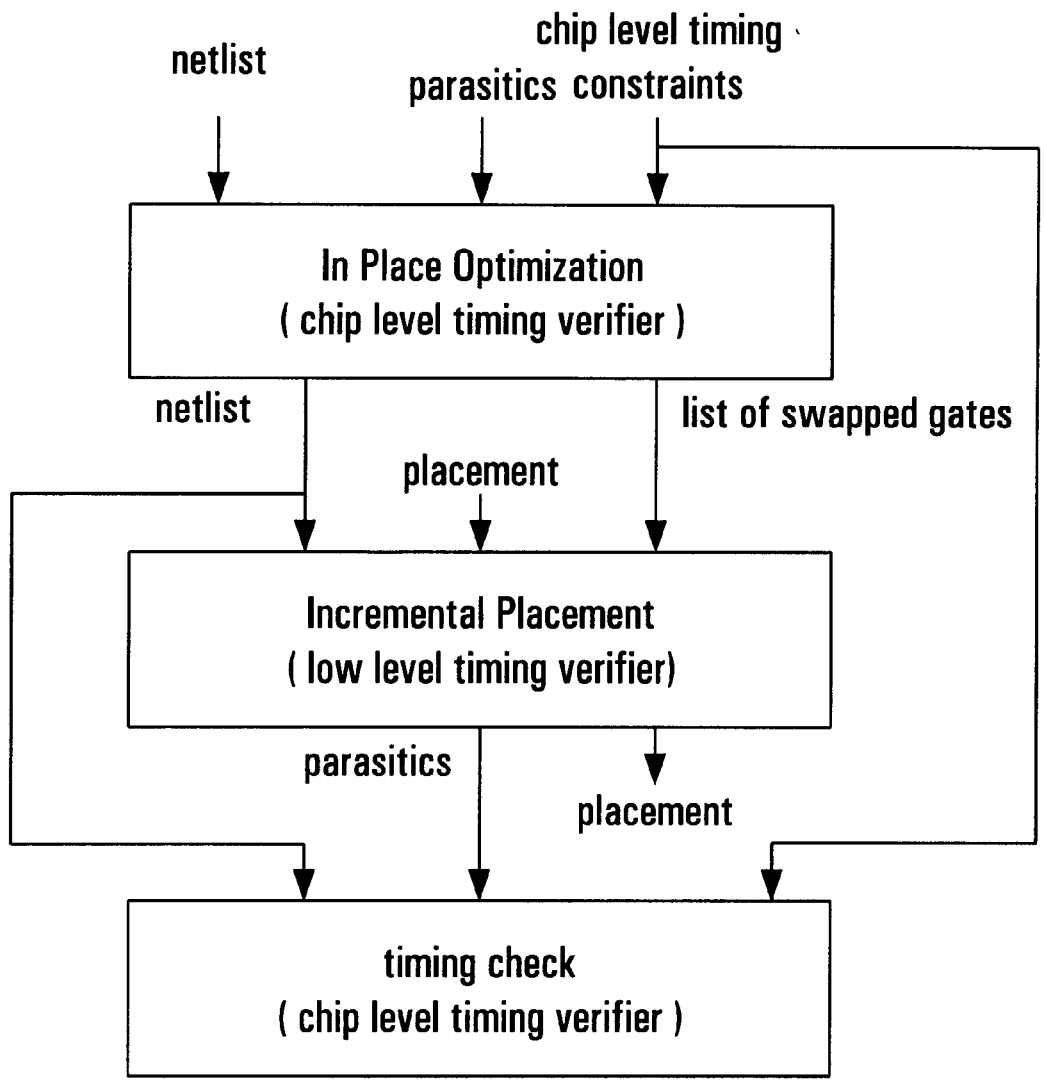
FIG. 3 illustrates a known process of in-place optimization.

(iv) A TDL flaw (shown in FIG. 2) in itself is also badly implemented, it first forces the user to load initially the complete design in the forward annotator together with the chip level timing constraints in order to generate the digested low level timing constraints (SDF file), it then forces the user to load the design together with the SDF file in the placement tool in order to perform a timing driven placement and extract the parasitics, and finally, most of the time, the user will have to reload the design together with the parasitics in the chip level timing verifier in order to check the placed design timing.

(v) The floor-planning and placement tools are not able to give to the designer sufficient information regarding the timing and the design rules violations. That is, if the user wishes to compare two different placements or two different floor-plans on a timing point of view, he has each time to quit the placement/floor-planning tools with an extraction of the parasitics, load them back in the chip level timing verifier. The user will then obtain some values reflecting the amount by which the constraints violated, but it will be very difficult to relate these values to the placement/floor-plan in order to find out why the placement/floor-plan is bad and how it could be improved.

The IPO flow suffers from the following main problem. At the end of the placement, the design needs first to be reloaded together with the parasitics in the IPO tool (usually available in most of the Synthesis tools). In order to perform the IPO itself, the in-place optimized design needs then to be written into bulk memory (such as a disk) and reloaded in the placement tool in order to replace the swapped cells. Now interconnect capacitance are then estimated by the placement tool. Finally, the design needs to be reloaded in the timing verifier to check the final design with the final estimated interconnect capacitance. Clearly enough, the IPO flow could be drastically improved if one could omit all the loading/writing phases.

The objects of the invention are thus:
(i) to have the possibility of running timing layout algorithm using front end high level timing constraints;
(ii) to have the possibility of running in place optimization within a placement tool in order to fix high-level timing constraints timing violations as well as design rule violations; and
(iii) to provide as much information related to the timing from the placement/floor-planning tool as possible and to relate this information to the placement/floor-planning of the design in order to help the designer to estimate the performance of the current placement/floor-planning. He could then be able to compare same different floor-planning/placement and to pick the best one. He will also be guided by this information in order to manually improve the floor-planning/placement.

The invention broadly comprises:
a common timing verification engine, understanding and checking high level timing constraints;
a timing verifier superimposed on the common timing engine, the timing verifier being the user interface with the common timing engine; and
a placement/floor-planning tool superimposed on the common timing verification engine. The common timing verification engine is preferably also used in a stand-alone timing verifier as well as in a front end RTL synthesis tool.

Figure 4:
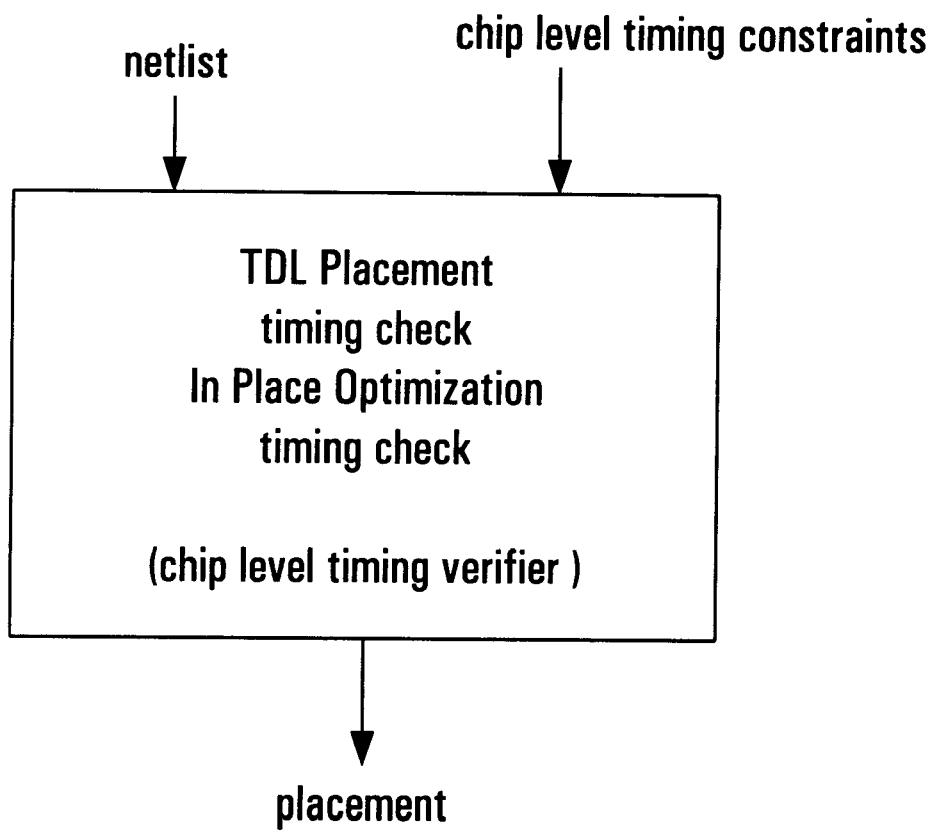
FIG. 4 shows the new TD and IPO flows using CTAE.

One example of the invention is indicated in FIG. 4.
The advantages of this new system are as follows:
(a) The design is loaded once rather than for example six times.
(b) There is no more need to generate the SDF file.
(c) Because there are no SDF files, the chip planner will not use any memory to store all the paths represented in those files.
(d) TDL will be more accurate because it will use CTAE to compute node slacks rather than only tracing along the SDF file paths.
(e) It will be possible to run directly any timing report from the chip planner: there is no need to run QTV/chipTime to get timing information.
(f) IPO is also run inside the chip planner; swapped gates are automatically and incrementally replaced by the placement engine.

Figure 5:
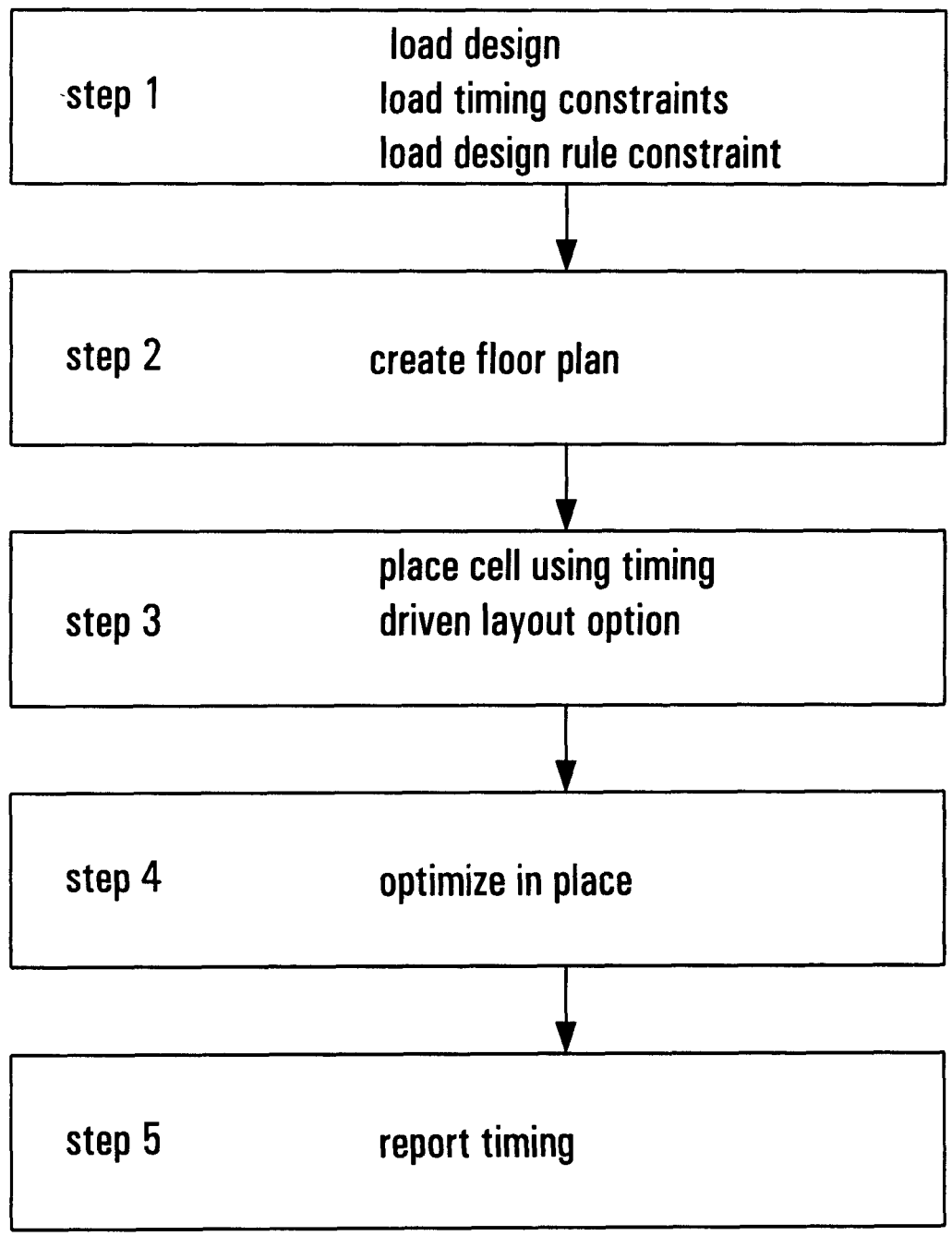
FIG. 5 shows a typical and optimistic chip planner's timing driven flow.

Once the placement/floor-planning tool is installed on the top of the common timing engine, a typical and optimistic placement timing driven design flow looks as shown in FIG. 5. When the common timing engine is invoked to check the high level timing constraints, the physical wiring capacitances are estimated by the placement tool and used during the timing propagation. Then, together with the timing path trace report, critical instances are highlighted in the graphic pane of the placement tool which allows the user to understand where the problem is.

Note that in FIG. 5 the flow is optimistic because it assumes that after the TDL placement and the IPO, there are no more timing violations reported by step 5. In case there are still some timing violations, the designer will have to reiterate steps 3 and 4 as long as the reiteration reduces the timing violations. If the reiteration does Not fix all the timing violations, one should either conclude that this is impossible or try to resynthesize the design with a new wirecap model; indeed, it might be that during the synthesis a too optimistic wirecap model has been used.

Note also that at the end of step 3, the designer can already invoke the timing report and only run the IPO (step 4) in case he are timing violations after TDL placement.

Note finally that the designer may report the timing as soon as the wiring capacitance can be estimated by the chipPlanner, that is as soon as the floor-plan is created. If the worst timing slack much greater than +0 ns, so that any timing violations (when the slack would be negative) are unlikely, the designer might even be tempted to omit the timing driven placement and merely to ran a standard unconstrained placement, assumed to use less cpu time. As a conclusion, a more realistic flow will look like that sin in FIG. 6.

Figure 6:
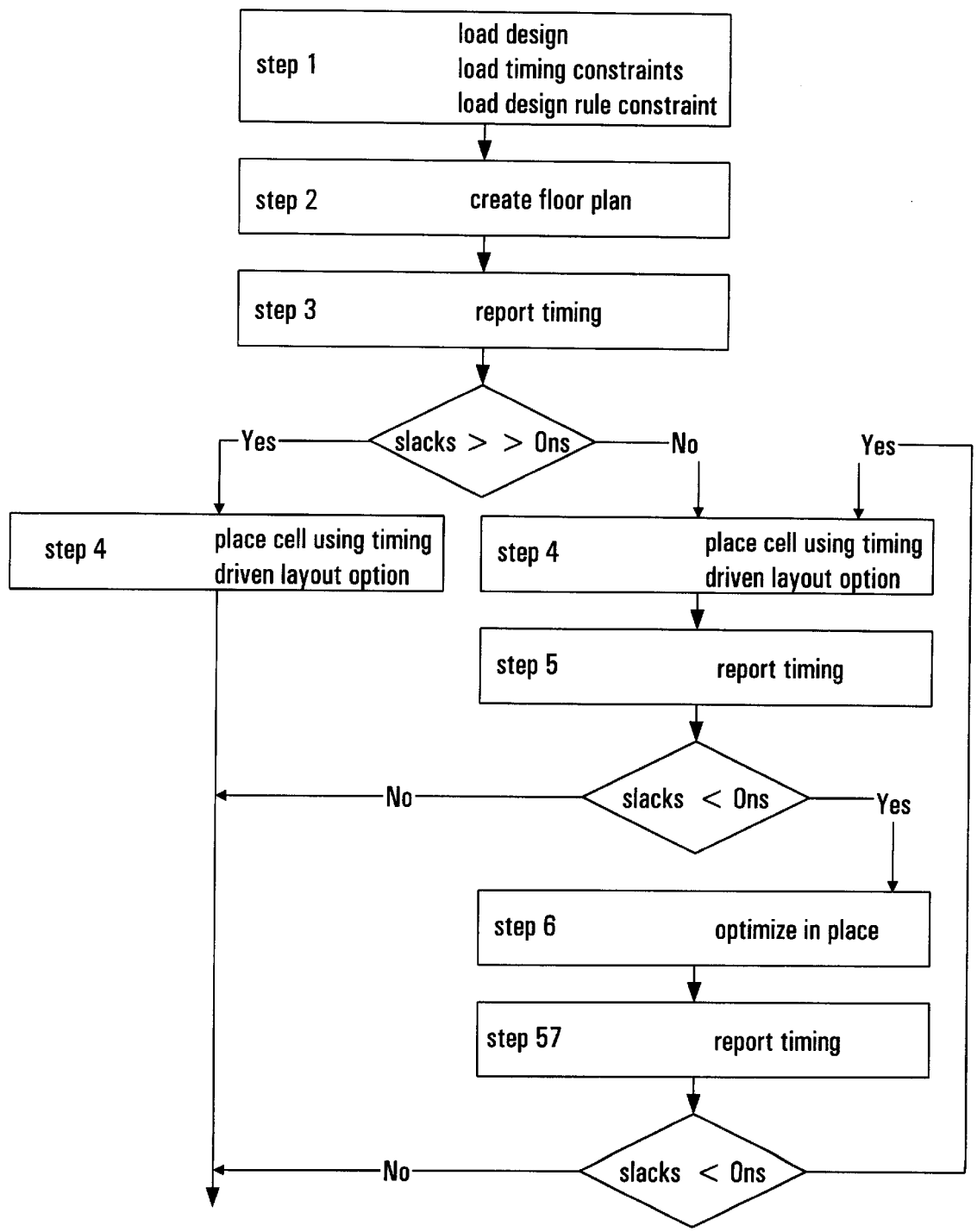
FIG. 6 shows a realistic timing driven flow.

In FIG. 6, assuming that after step 3 the slacks are really very negative, then the user should not expect to be able to fix the timing violations by using the TDL or the IPO. The only thing he could do would be to derive custom wireload-modal and to run a new optmization (so-called Post Layout Optimization) of the full design, using his favourite synthesis tool.

A congestion map is a graphical way to give information to the user in order to help him to find out what he should do to improve the floor-plan/placement/routing. In this invention three types of congestion maps have been implemented, timing constraint related congestion maps, design rules related to congestion maps, and skew related congestion maps.

This will colour or modify the design according to some criteria that are timing, skew or design rules. Once one has a congestion map one may still use the instance selectors in order to view only the instances that you want to see. As will be seen in the section, problematic instances are often coloured in red in the congestion maps. An interesting thing to do is for instance to 'edit→select inst' 'u1,u2' to only keep the instance belonging to the logic hierarchical cell 'u1,u2'. If all the instances are in blue, one already know that the logic hierarchical cell 'u1,u2' is satisfactory.

An instance slack based congestion map is a colouration of the design instance according to the slacks or the percentage slacks on the output connectors of that instance. This is important information which helps to quickly find out where the problematic blocks are and cot two floor plans on a timing point of view.

The way to produce an instance slack based congestion map is to get the wiring capacitances as they can be estimated by the placement tool, to digest high level timing constraints, to compute signal arrival time on input nodes of high level timing constraints, to probate signal arrival times through all the design, to propagate signal required times through all the design, compute the slacks on the design instances as being the worst difference between the signal required time and the signal arrival on all the instance output connectors, and to modify the instance according to the negativity of the slacks that is according to the amount by which the instance violates the timing constraint.

A nods slack based congestion map is a modification of the design nods according to the slacks or the percentage slacks on that node. This is helpful information telling you if indicating Her there are timing problems inside block only or between a couple of blocks, in other words does one have critical 'colour' segments between to blocks or are there critical 'colour' segments inside a block. If there are critical segments between the two blocks this might mean that one has to put these blocks closer or even to merge them.

The way to produce an instance slack based congestion map is to perform a pin-based estimated routing, get the wiring capacitances as they can be estimated by the placement tool, digest high level timing constraints, compute signal arrival time on input nodes of high level timing constraints, compute signal requited times on output nodes of high level timing constraints, propagate signal arrival times through all the design, propagate signal required times through all the design, compute the slacks on the design nodes as being the difference between the signal required time and the signal arrival on all that node, and colour the node segments according to the negativity of the slacks according to the amount by which that node violates the timing constraint.

An instance skew based congestion map is a colouration of the design instance according to the skew on the instances. This information which helps to quickly find out where the problematic blocks are and cod two floor-plans on a skew point of view.

The way to produce an instance slack based congestion map is to get the wiring capacitance as they can be estimated by the placement tool, propagate the clock signals along the clock network up to the sequential elements clocked by that clock, compute the skew on these sequential elements, the skew on a sequential element being defined as the difference between the clock signal rival time on that sequential element and the smallest clock signal rival time on any sequential element clocked on that clock, and colour the instances according to the skew.

What is claimed is:

1. A programmed design tool for a very large scale integrated circuit, chlaracterised by a common timing engine adapted to check front end high level timing constraints in relation to a netlist representing the circuit, and further comprising:

a timing verifier controlled by the common timing engine;

a front end synthesis tool controlled by the common timing engine;

a placement/floor-planning tool using the common timing engine in order to highlight critical instances in a graphic display and to perform timing driven placement; and an in-place optimization tool using the common timing engine and installed in the placement/floor-planning tool the in-place optimization tool adapted to modify components on a critical path reported by the common timing engine.

2. A programmed design tool according to claim 1 adapted to create congestion maps automatically.

3. A method of determining the placement of components of a very large scale integrated circuit from a netlist thereof, using a programmed computer, chlaracterised in that the method includes:

using a common timing engine to check front end high level timing constraints in relation to a netlist representing the circuit;

operating a timing verifier using the common timing engine;

operating a front end synthesis tool using the common timing engine;

using a placement/floor-planning tool to highlight critical instances in a graphic display and to perform a timing driven placement; and using an in-place optimization tool to modify components on a critical path reported by the common timing engine.

4. A method according to claim 3 adapted to create congestion maps automatically.

* * * * *